United States Patent [19]
Hemingway et al.

[11] Patent Number: 6,002,089
[45] Date of Patent: Dec. 14, 1999

[54] NON-LINEAR RACEWAY SECTION HAVING RADIAL INSERT

[75] Inventors: Jeffrey D. Hemingway, Burlington; Steven Pawson, Waterbury, both of Conn.

[73] Assignee: The Wiremold Company, West Hartford, Conn.

[21] Appl. No.: 08/938,285

[22] Filed: Sep. 26, 1997

[51] Int. Cl.$^6$ ........................................................ H02G 3/04
[52] U.S. Cl. ........................ 174/97; 174/99 R; 52/220.7; 439/210
[58] Field of Search .................. 174/95, 96, 97, 174/98, 99 R, 99 B, 99 E, 100, 101, 68.1, 683; 52/220.7, 287.1, 290; 248/53, 220.1; 439/207, 208, 210; 385/134, 135, 136

[56] References Cited

U.S. PATENT DOCUMENTS

| | | | |
|---|---|---|---|
| 3,881,520 | 5/1975 | Murphy | 138/109 |
| 5,161,580 | 11/1992 | Klug | 138/92 |
| 5,214,735 | 5/1993 | Henneberger et al. | 385/136 |
| 5,530,787 | 6/1996 | Arnett | 385/137 |
| 5,777,270 | 7/1998 | West et al. | 174/99 B |

*Primary Examiner*—Kristine Kincaid
*Assistant Examiner*—Dhiru R Patel
*Attorney, Agent, or Firm*—McCormick, Paulding & Huber LLP

[57] ABSTRACT

A non-linear raceway section for containing fiber optic and Category 5 signal conductors and formed by intersecting raceway runs coupled together in a region of intersection defines a non-linear raceway channel having an exposed angular corner therein. A radiused insert releasably retained within the raceway channel defines a portion of the channel and isolates the angular corner from the channel.

23 Claims, 10 Drawing Sheets

THIS SIDE UP WHEN USED WITH 4011

NON-LINEAR RACEWAY SECTION HAVING RADIAL INSERT

BACKGROUND OF THE INVENTION

This invention relates in general to surface mounted raceway systems and deals more particularly with improvements in raceway systems for routing and containing fiber optic cable and/or category 5 data/communication wiring.

Surface mounted raceway systems for mounting on walls and or ceilings to route, contain and protect cables and wires are well known in the art. Such raceway systems must include a variety of non-linear fittings or sections, such as interior and exterior elbows and tees, as may be necessary to satisfy the requirements imposed by different room shapes and service access problems. Such fitting and raceway sections are employed where changes in the direction of cable and or wiring occur within a raceway system. The radius of each bend in a fiber optic cable or in wire pair employed in a category 5 data/communication circuit and carried by the raceway system must be controlled so that sharp bends which may damage optical fibers within a fiber optic cable or impair the integrity of one or more category 5 circuits supported within the raceway system cannot occur.

Accordingly, it is the general aim of the present invention to provide improved non-linear raceway sections and fittings for a surface mounted raceway system and which include at least one radial insert for controlling the bend radius of a fiber optic cable and or category 5 twisted pair wiring contained within the raceway system.

SUMMARY OF THE INVENTION

The present invention is concerned with improvements in a surface electrical raceway fitting of the type having a fitting base formed by a pair of intersecting channel sections, each of the channel sections having a plurality of walls including an inner end wall having a mounting surface and spaced apart top and bottom walls projecting outwardly from the inner wall. Walls of the intersecting channel sections define at least one angular corner within the fitting base. In accordance with the invention at least arcuate insert is disposed within the fitting base and forms an arcuate corner within the fitting base and between the one angular corner and the interior of the fitting base. A retaining means is provided for releasably securing the one arcuate insert in assembly with the raceway fitting to isolate the one angular corner from the interior of the fitting base.

DETAILED DESCRIPTION OF PREFERRED EMBODIMENTS

Figure 1:
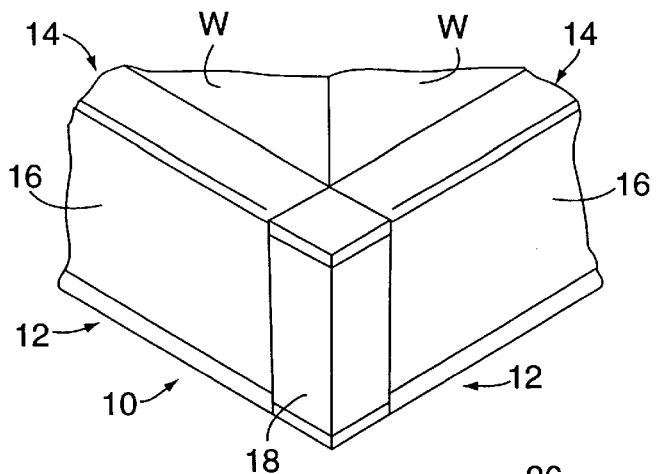
FIG. 1 is a perspective view of an undivided external elbow raceway section embodying the present invention.

In the drawings and in the description which follows, the present invention is illustrated and described with reference to non-linear raceway sections which comprise parts of surface mounted raceway systems for routing, containing and protecting signal conductors (not shown) which may, for example, include fiber optic cable and/or category 5 data/communication circuit wiring. The non-linear raceway sections hereinafter further discussed may comprise unitary structures or discrete raceway fittings for coupling engagement with elongated rectilinear raceway runs or may be formed by rectilinear raceway runs or fittings which intersect and are jointed together at the regions of intersection by coupling fittings or other interconnecting members to form a fitting base.

Turning now to the drawings, and referring first particularly to FIGS. 1–4, a typical non-linear raceway section or fitting base embodying the present invention is designated generally by the numeral 10. The illustrated raceway section comprises a part of a raceway system or installation typical of a type manufactured and marketed by The Wiremold Company, West Hartford, Conn. 06110, assignee of the present invention. The raceway section 10 is formed by the intersection of two individual elongated rectilinear lengths of raceway or raceway runs (Wiremold 4000 Two-Piece Surface Steel Raceway) indicated generally at 12, 12 and shown mounted on the surface of building walls W, W at an external corner of a room (FIG. 1). Each raceway run 12 may be several feet in length and includes an outwardly open raceway base channel, indicated generally at 14, and a releasably retained cover 16 which cooperates in snap-on engagement with the open base channel 14 to provide a closure for the base channel. The two raceway runs 12, 12 intersect and are joined together in the region of intersection by an interconnecting member (Wiremold 4018 External Elbow) shown somewhat generally, in FIG. 3 and identified by the reference numeral 18. The illustrated raceway section or fitting base 10 defines a part of an undivided raceway channel 20 for containing signal conductors (not shown) which may include one or more fiber optic cables and/or Category 5 data/communication conductors.

Figure 2:
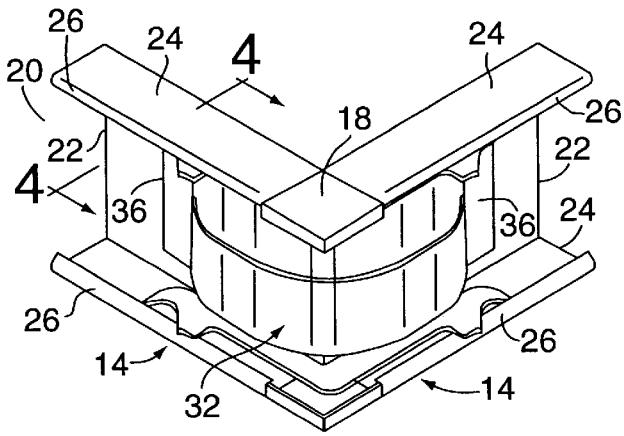
FIG. 2 is a perspective view of the raceway section of FIG. 1 shown with the covers removed to reveal the radiused insert therein.
Figure 3:
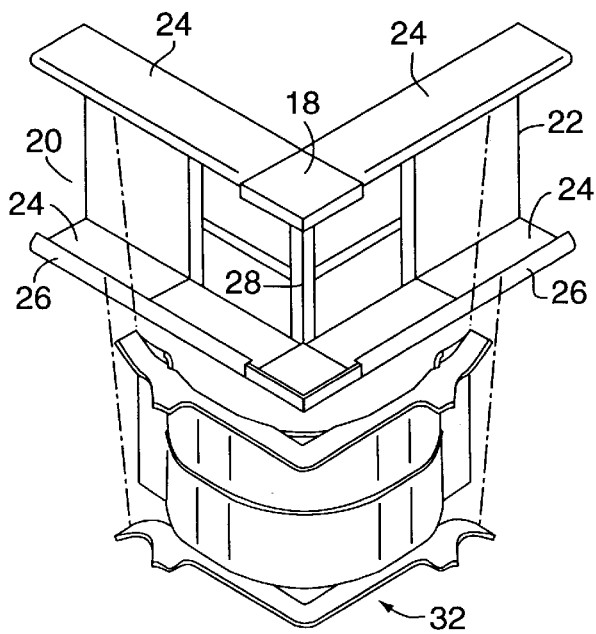
FIG. 3 is an exploded perspective view of the raceway section shown in FIGS. 1 and 2.
Figure 4:
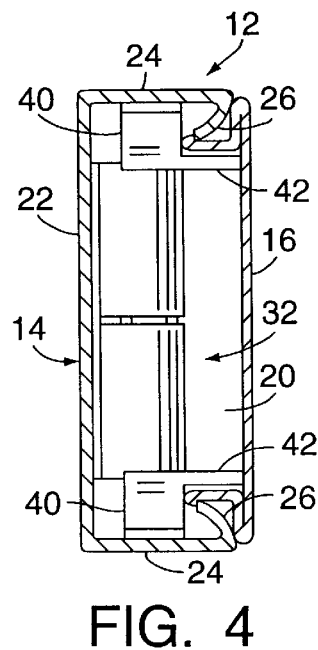
FIG. 4 is a somewhat enlarged sectional view taken along the line 4—4 of FIG. 2.

In FIGS. 2 and 3 the raceway section 10 is shown with the covers 16, 16 and portions of the interconnecting member or external corner fitting 18 removed. As shown in the drawings, each raceway base channel 14 has a base wall 22 and upper and lower channel walls 24, 24 which are integrally connected to the longitudinally extending upper and lower edge portions of the base wall 22 and extend outwardly from the base wall in opposing parallel relation to each other. The longitudinally extending outer edge of each channel wall 24 is turned inwardly toward the base wall 22 forming a lip 26, as best shown in FIG. 4. The base walls of the two intersecting raceway base channels 14, 14 generally intersect to form an angular corner 28 within the raceway channel 20, generally as shown in FIG. 3.

The presence of an angular corner 28 within the non-linear raceway section 10 presents a potential source of damage to fragile fiber optic signal conductors and Category 5 wiring, particularly during installation and servicing. Even slight tension applied to such signal conductors at a location within a raceway system and remote from raceway section of the system which contains a corner can cause sharp bending of one or more of the signal conductors at the corner. A sharp bend can damage a fiber optic cable or cause separation of twisted wire pairs in a data/communication wiring circuit resulting in parallelism within the circuit, thereby impairing category 5 circuit performance. In accordance with the present invention, an arcuate or radiused insert, designated generally by the numeral 32, is positioned within the raceway channel 20, substantially as shown, to overcome this problem, as will be hereinafter further discussed.

Figure 5:
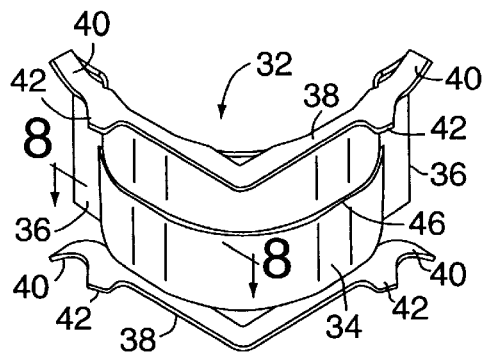
FIG. 5 is a somewhat enlarged perspective view of the radiused insert shown in FIGS. 2 and 3.
Figure 6:
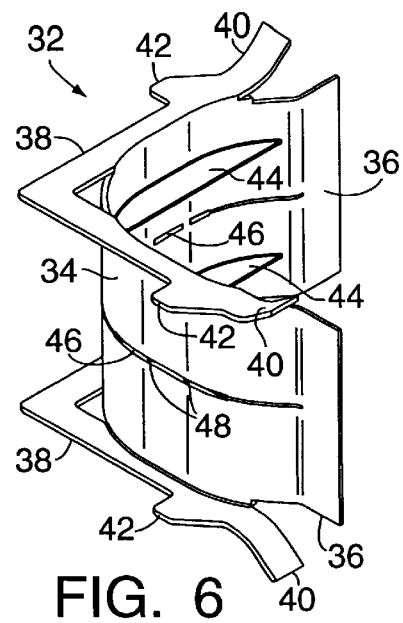
FIG. 6 is another perspective view of the insert shown in FIG. 5.
Figure 7:
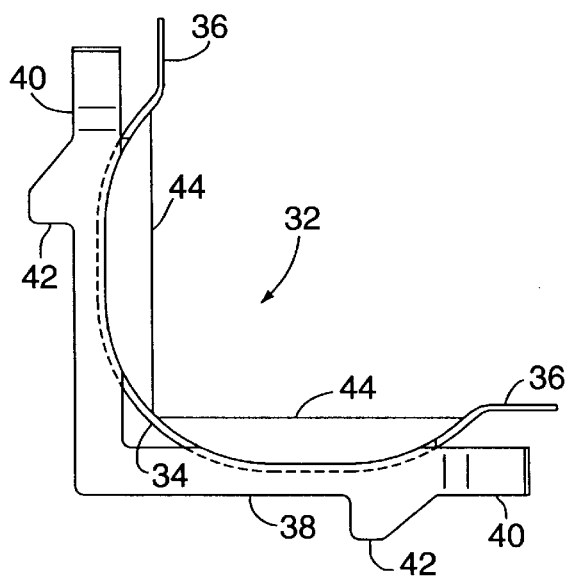
FIG. 7 is a top plan view of the insert.

Referring now particularly to FIGS. 5–9, as shown in the drawings, the presently preferred arcuate or radiused insert 32 comprises a thin-walled unitary structure, preferably molded from a resilient severable plastic material, that is a material which can be radially cut using a knife. The insert 32 includes a convexo-concave arcuate wall 34, that is a wall having a convex side and a concave side, the convex side having a greater curvature than the concave side. The convex or radially outer surface of the wall 34 has a general radius of curvature of at least 2 inches (50.8 mm) and subtends an arc of approximately 180°. A pair of seating tabs 36, 36 are integrally connected to and extend vertically along the opposite ends of the arcuate wall 34 and project horizontally outwardly in opposite directions from it. The latter tabs are angularly arranged at approximately 90° relative to each other as viewed from above and as best shown in FIG. 7.

Generally L-shaped stiffening members 38, 38 disposed in generally radial planes relative to the arcuate wall 34 are integrally connected to the upper and lower edges of the wall and project generally radially outwardly from it, substantially as shown. Resilient retaining tabs 40, 40 are formed by the free ends of the L-shaped stiffening members 38, 38 and are bent outwardly and away from each other in axial directions as best shown in FIGS. 5 and 6. Each stiffening member 38 also has a pair of retaining fingers 42, 42. Each retaining finger is located near an associated retaining tab 40 and projects outwardly and away from the wall 34, as shown, for a purpose which will be hereinafter further evident. Stiffening ribs 44, 44 disposed in radial planes of the wall 34 and integrally connected to the inner or concave side of the wall 34 impart further structural integrity to the insert 12.

Figure 8:
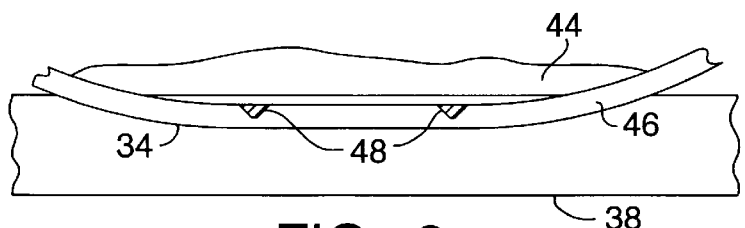
FIG. 8 is a somewhat enlarged fragmentary sectional view taken along the line 8—8 of FIG. 5.

A radially disposed slot 46 extends through the wall 34, terminates at the a seating tabs 36, 36 and divides the arcuate wall 34 into substantially equal upper and lower parts. A series of relatively finite severable connecting members 48, 48 bridge the slot 46 and provide connection between the upper and lower parts of the wall 34 separated by the slot 46, as best shown in FIG. 8. It will be noted that the portions of the arcuate wall 34 are slightly flattened in the regions of connection to the L-shaped stiffening members 38, 38 as best shown in FIGS. 7 and 8.

The arcuate member 32 is constructed and arranged for snap-in assembly within the raceway section 10 and the exploded view of FIG. 3 illustrates the manner in which the insert 32 is assembled with the raceway section. The body of the insert 32 is generally sized to pass between the lips 26, 26 on the upper and lower channel walls 24, 24 when the resilient vertically opposing retaining tabs 40, 40 are deflected toward each other to pass between the lips. When the tabs 40, 40 clear the lips 26, 26 the retaining tabs are released and snap into engagement with the inner surfaces of the upper and lower channel walls 24, 24 inwardly of the lips 26, 26 to retain the insert within the raceway channel 20. In assembly, the seating tabs 36, 36 are disposed in abutting or seating engagement with respectively associated base walls 22, 22, as best shown in FIGS. 3 and 4. When the raceway covers 16, 16 are snapped in place the outer ends of the retaining fingers 42, 42 engage the inner surface of the cover 16, substantially as shown in FIG. 4 and thereby further secure the insert 32 in assembly within the non-linear raceway channel section 10. When the insert 32 is assembled with the raceway section within the undivided raceway channel 20, as shown in FIG. 2, the outer or convex surface of the insert defines a portion of the raceway channel 20. The insert 32 also effectively isolates the sharp angular corner 28 from the raceway channel 20 and provides an effective means for controlling the bending radius of signal conductors disposed within the channel, thereby reducing, if not substantially eliminating, the risk that the signal conductors (not shown) will be exposed to excess bending during installation and when the system is serviced.

Figure 10:
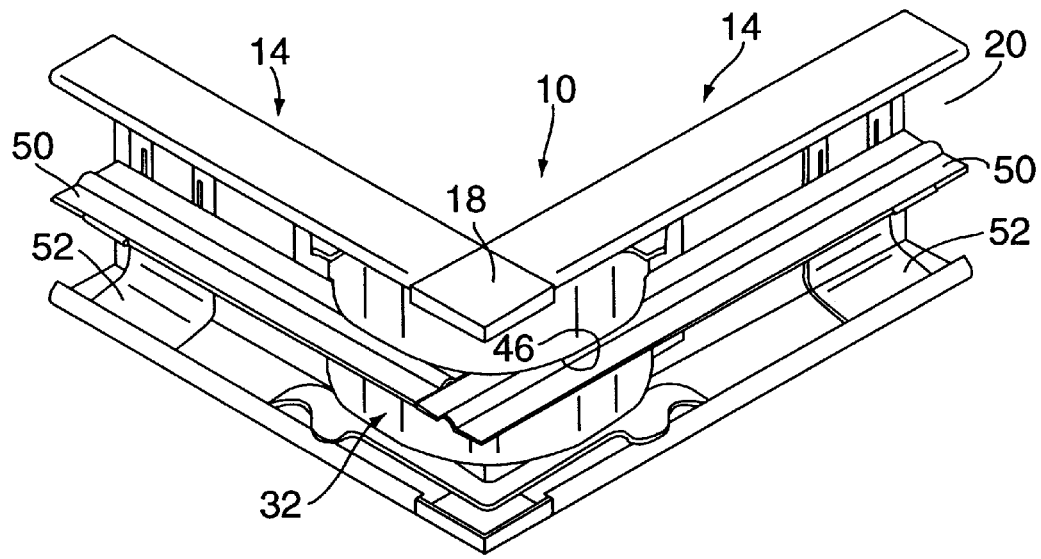
FIG. 10 is similar to FIG. 2 but shows a divided external elbow raceway section.
Figure 11:
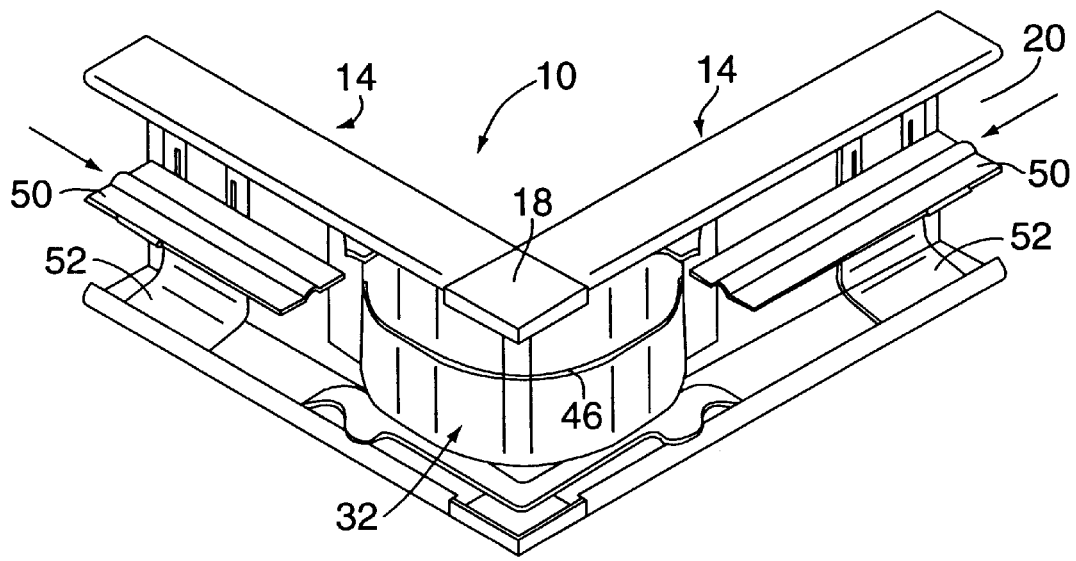
FIG. 11 is a perspective view of the raceway section of FIG. 10 shown in a state of partial assembly.

The illustrated non-linear raceway section 10 may also be adapted for use in a divided raceway system for containing both electrical power conductors and signal conductors. Such an arrangement of the channel section 10 is shown in FIGS. 10 and 11. Specifically, ribbed dividers, indicated at 50, 50 are retained within the raceway channel 20 by retaining clips 52, 52, in a manner well known in the raceway art, and divide the raceway channel into separate and distinct upper and lower raceway compartments, one for containing the electrical power conductors and the other for receiving and containing fiber optic and/or category 5 data/communication signal conductors. The radiused insert 32, hereinbefore described is also employed in the divided raceway section 10 to protect the signal conductors from excess bending in the manner hereinbefore described.

Figure 9:
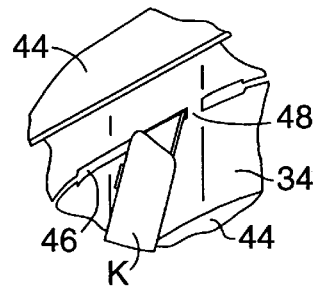
FIG. 9 is a somewhat enlarged fragmentary perspective view showing the insert being prepared for use in a divided raceway.

The radiused insert 32 is prepared for use with a non-linear raceway section, such as the section 10 by severing the connecting members 48, 48 which bridge the slot 46 to open the latter slot along its entire length between the seating tabs 36, 36. The relatively finite connecting members 48, 48 can easily be removed from the slot using a cutting tool such as a, utility knife where the knife is indicated by the letter K, as shown in FIG. 9.

Prior to assembling the dividers 50, 50 within the raceway section 20, the insert 32 is assembled with the raceway section 10 within the raceway channel 20. Thereafter, the dividers 50, 50 are assembled with the raceway section within the raceway channel 20. The dividers are preferably moved into the slot 46 with sliding motion in the directions indicated by the directional arrows in FIG. 11 and brought into intersecting engagement with each other as shown in FIG. 10. The slot 46 is sized to receive at least an edge portion of each divider 50, but and may also accommodate at least a part of the longitudinally extending stiffening rib on each divider. The, previously mentioned, slightly flattened portions of the arcuate wall 34 lie along respectively associated portions of the stiffening ribs on the dividers and substantially complement the latter ribs when the dividers 50, 50 are in assembly with the insert 32 and within the slot 46. As in the previously described embodiment the insert 32 controls the bending radius of the signal conductors where an abrupt change of conductor direction occurs within the raceway system, thereby reducing if not substantially eliminating risk of bending damage to the signal conductors during installation and servicing.

Figure 12:
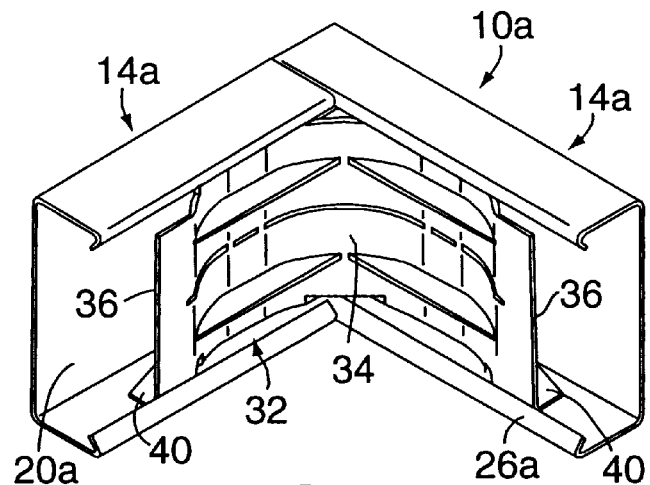
FIG. 12 is similar to FIG. 2 but shows an internal elbow raceway section embodying the present invention.
Figure 13:
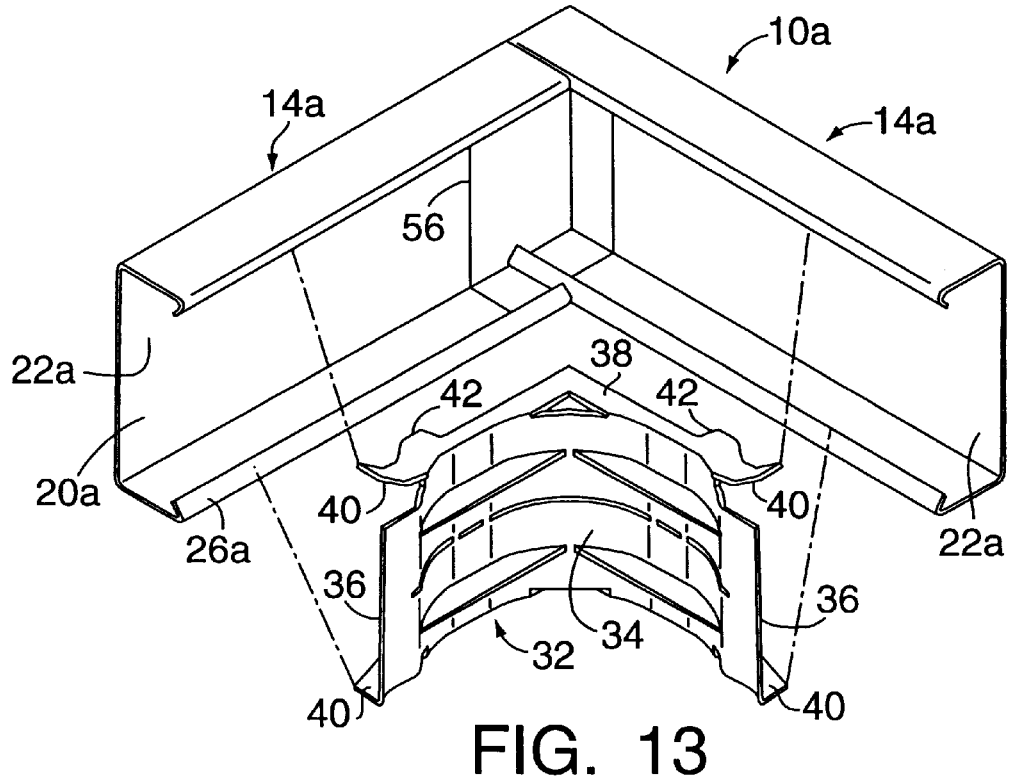
FIG. 13 is an exploded perspective view of the raceway section shown in FIG. 12.

FIGS. 12 and 13 illustrate the manner in which the radiused insert 32 is employed in combination with a non-linear internal elbow raceway section or fitting base, generally indicated at 10a and particularly adapted for wall surface mounting in an internal corner of a room. The raceway section 10a is similar to the previously described section 10 in that it is formed by the intersection of two elongated rectilinear lengths of raceway or raceway runs (Wiremold 4000 Two-Piece Surface Steel Raceway). The intersecting raceway runs are joined in the region of intersection by an internal elbow coupling member (Wiremold Part No. 4017) indicated by the numeral 56 in FIG. 13. The raceway section 10a is shown with the covers removed therefrom to reveal the undivided non-linear raceway channel 20a formed by the intersecting raceway base channels 14a, 14a. Although the raceway covers are not shown it will be apparent that an angular corner is formed within the raceway channel by the intersection of the covers when the covers are assembled with the base channels 14a, 14a. The insert 32, previously described, is employed to eliminate the potential problem presented by the corner formed by the intersecting covers and exposed within the raceway channel. Specifically, the insert 32 is assembled with the raceway section 10c so that the convex surface of the insert wall 34 faces inwardly or generally toward the base walls 22a, 22a of the raceway base channels 14a, 14a. The insert 32 is positioned in snap-in assembly within the raceway section 10a by deflecting the resilient retaining tabs 40, 40 to clear the lips 26a, 26a on the respective raceway base channels 14a, 14a, as previously described. In assembly the retaining fingers 42, 42 engage respectively associated base walls 22a, 22a of the raceway channels and the seating tabs 36, 36 bear upon the inner surfaces of the respective raceway covers and serve to retain the insert 32 in proper assembled position within the raceway section 10a.

As in the previously described embodiments, the convex wall surface of the insert 32, in assembly, defines a portion of the raceway channel 20a. The insert 32 also effectively isolates the relatively sharp angular corner formed by the intersection of the raceway covers from the raceway channel 20a which contains the signal conductors (not shown), thereby substantially reducing risk of damage to the signal conductors.

Figure 14:
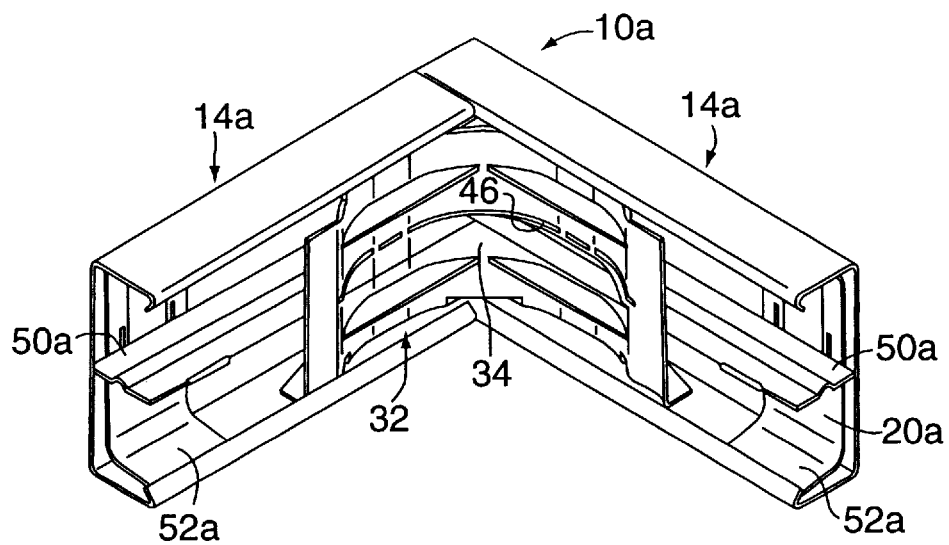
FIG. 14 is a perspective view of a divided internal elbow raceway section embodying the invention.
Figure 15:
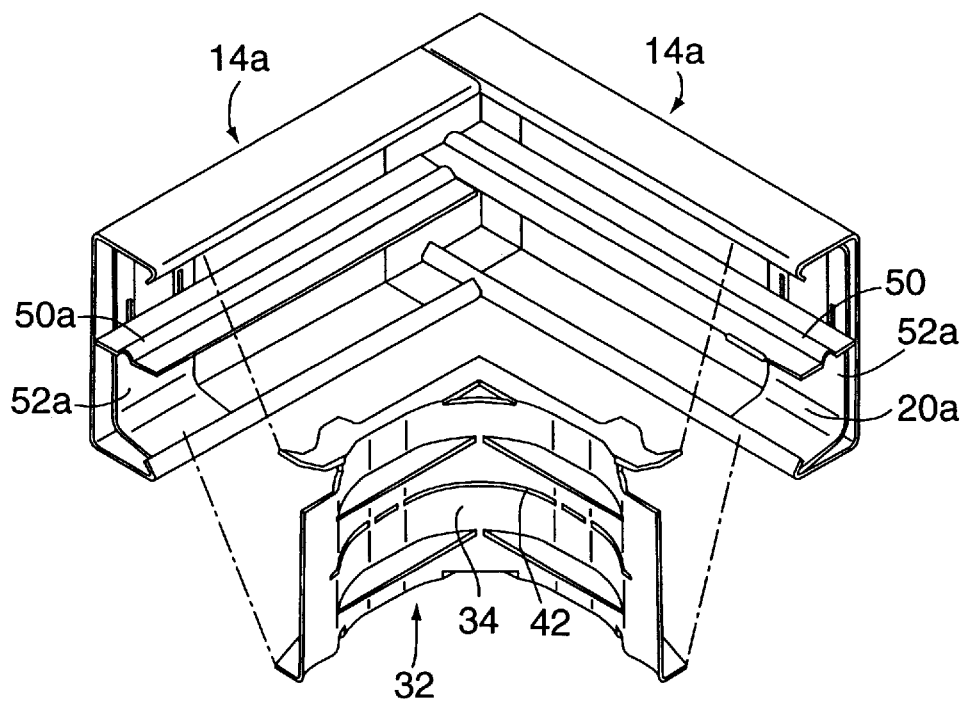
FIG. 15 is an exploded perspective view of the raceway section shown in FIG. 14.

The insert 32 may also be employed in a divided non-linear raceway section which forms an internal corner part of a raceway system or installation. Such a divided raceway section is shown in FIGS. 14 and 15. The insert 32 is employed to isolate an angular corner formed within a divided raceway channel by the intersection of the two raceway covers which provide the closure for the raceway channel, as previously discussed. In FIGS. 14 and 15 the manner in which the previously described undivided raceway section 10a, is connected to a divided raceway section while retaining the protection afforded by the insert 32 is illustrated. The insert 32 is prepared for assembly with the raceway section 10a, which is to be divided, by severing and removing the finite connecting members 48, 48 which join the upper and lower portions of the arcuate wall 34, as shown in FIG. 9, to open the slot 46. Dividers 50a, 50a are first assembled within the raceway channel 20a, being held in place by retaining clips 52a, 52a, as shown Thereafter the insert is assembled with the raceway section 10a substantially as previously described and as shown in the exploded view of FIG. 15. The signal conductors and power conductors may be installed within the raceway channel 20a either before or after the insert 32 has been assembled with the raceway section. The assembly is completed by positioning the raceway covers (not shown) on the raceway base channels 14a, 14a.

It should now be apparent that a single radiused insert may be produced in accordance with the invention to satisfy varying requirements imposed by the differing arrangements of non-linear raceway sections, thereby substantially reducing the parts inventory necessary to satisfy these diverse raceway requirements. Since the same insert may be used in several different raceway sections, a substantial saving in parts production will be realized.

In the various surface mounted raceway sections hereinbefore described, the corners shielded by the inserts are formed by either intersecting base walls of raceway base channels or intersecting raceway covers. However, in contrast, when the invention is practiced with non-linear flat raceway sections the corners which must be shielded are formed by the channel walls of intersecting raceway base channels.

Figure 16:
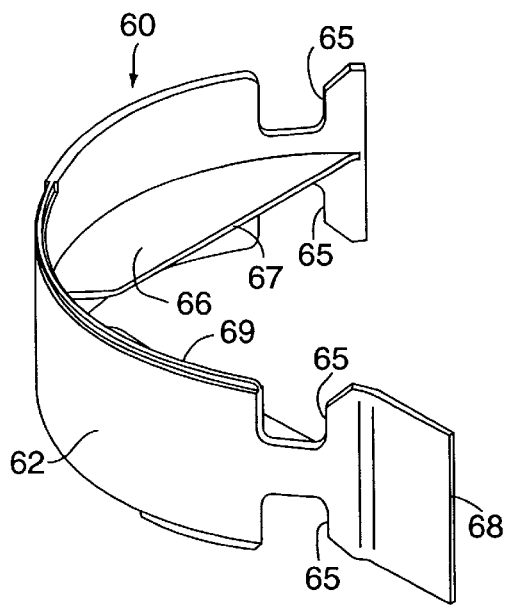
FIG. 16 is a perspective view of a radiused insert for use in a flat raceway section.
Figure 19:
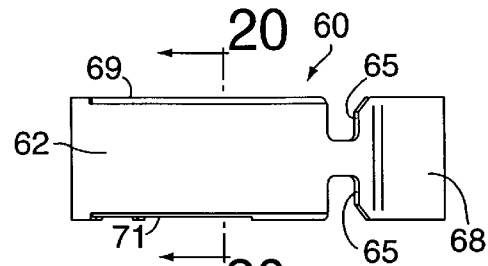
FIG. 19 is a side elevational view of the insert as it appears in FIG. 17.
Figure 17:
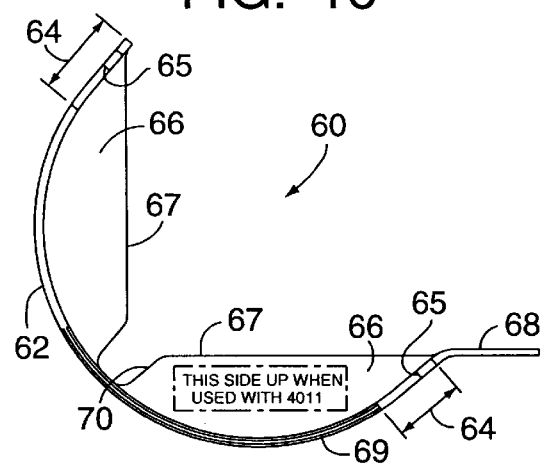
FIG. 17 is a top plan view of the radiused insert of FIG. 16.
Figure 20:
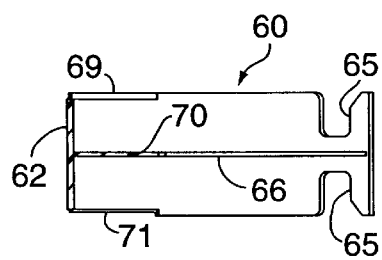
FIG. 20 is a sectional view taken along the line 20, 20 of FIG. 19.
Figure 18:
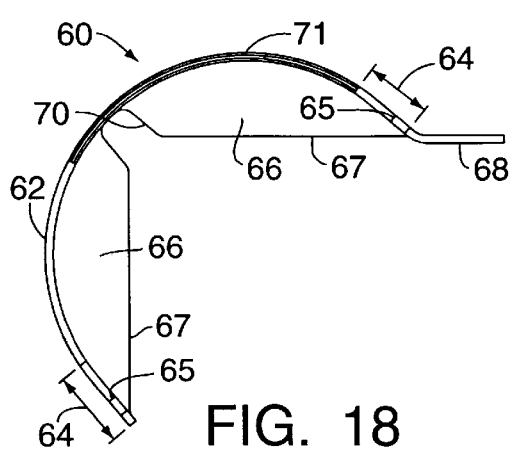
FIG. 18 is a bottom plan view of the radiused insert of FIG. 16.
Figure 21:
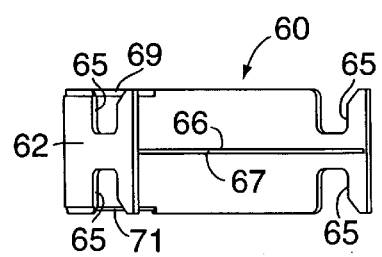
FIG. 21 is a side elevational view of the radiused insert shown rotated from its position of FIG. 19.

In FIGS. 16–21 there is shown another arcuate or radiused insert particularly adapted for use in non-linear flat raceway sections. The insert, generally indicated by the numeral 60, is preferably molded from resilient severable plastic material and essentially comprises a thin-walled structure having a substantially uniform thickness and a convexo-concave wall 62. The wall 62 has a radius of curvature of at least 2 inches (50.8 mm) which subtends an arc of about 160°. The wall 62 has opposite end portions 64, 64 which extend for some distance from the arcuate portion and in generally tangential directions relative to the arcuate portion. A pair of vertically aligned retaining notches 65, 65 are formed in each end portion 64 and open through the upper and lower edges of the end portion, substantially as shown. A seating tab 68 is integrally connected to the terminal end of one end portion 64 and is inclined outwardly and away from the latter end portion. A pair of radially disposed stiffeners 66, 60 integrally connected to the inner or concave surface of the wall 62 midway between the upper and lower edges of the wall extend from a central portion of the wall to the terminal ends of the end portions 64, 64. The stiffening members 66, 66 have rectilinear inner edges 68, 68 which extend toward a point of intersection at the central portion of the wall 62 and form and included angle of 90°. A relief notch 70 is formed in the region of intersection between the two edges 68, 68, as best shown in FIGS. 16 and 17. The upper and lower edges of the wall 62 have regions of reduced thickness 69 and 71 which extend therealong, substantially as shown.

Figure 22:
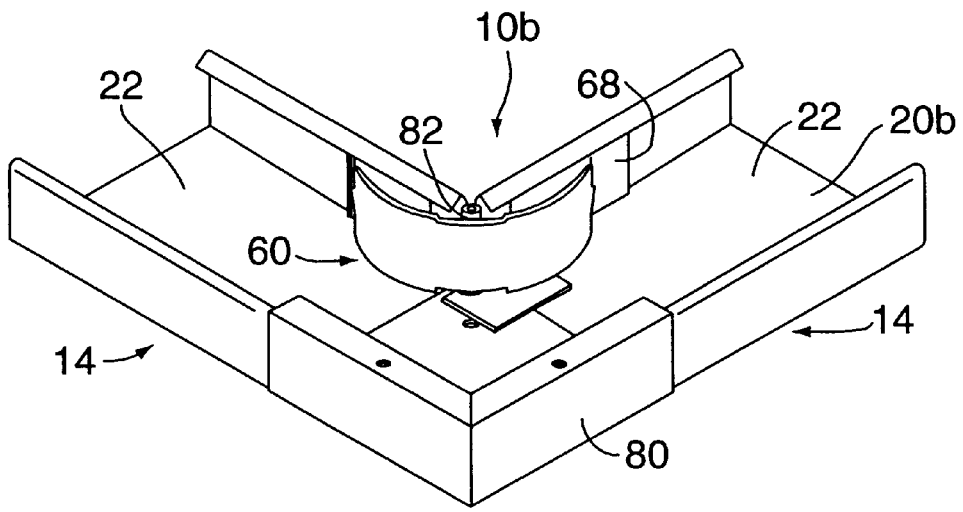
FIG. 22 is a perspective view of a flat raceway elbow fitting embodying the invention and shown with the covers removed.
Figure 23:
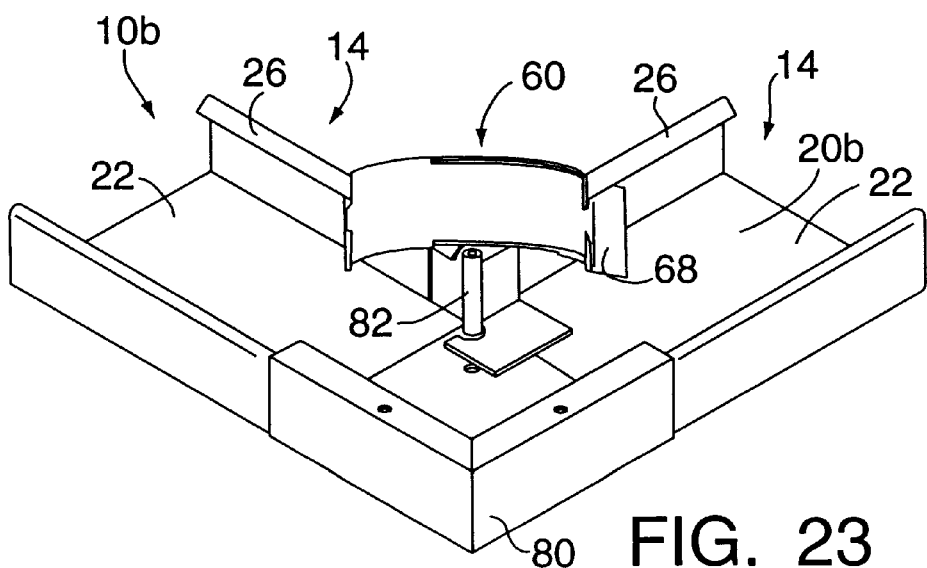
FIG. 23 is a perspective view of the raceway fitting of FIG. 22 shown in a partial state of assembly.

Referring now to FIGS. 22 and 23, the manner in which the insert 60 is used in a non-linear flat raceway section is illustrated with reference to a flat elbow raceway section, or fitting base designated by the reference numeral 10b. The raceway section 10b is used to provide a right angle turn in a portion of a raceway system supported on a flat surface. The raceway section is formed by the intersection of two raceway runs (Wiremold 4000 Two-Piece Surface Steel Raceway) joined by a raceway fitting (Wiremold 4011 Flat Elbow Fitting) indicated at 74. In FIGS. 22 and 23 the flat elbow raceway section 10b is shown with the raceway covers removed.

Since a portion of the fitting 74 is disposed in a plane slightly above the plane of the base walls 22, 22 which comprise the raceway base channels 14, 14 it is necessary to prepare the insert 60 before positioning it in the raceway channel 20b. The insert 60 is prepared for assembly by trimming away the reduced wall portion 71 which provides the necessary clearance to accommodate the raised portion of the fitting 80. This trimming operation is performed using a cutting tool such as a utility knife.

Referring particularly to FIG. 23, where the insert 60 is shown in a partial condition of assembly, the notches 65, 65, which open through the upper edge of the insert 60 are hooked under the lips 26, 26 on the two raceway base channels 14, 14. After which the insert 60 is pivoted downwardly on the lips 26, 26 and to a position within the raceway channel 20b wherein portions of the lower edges of the insert engage the base walls 22, 22 of the intersecting raceway based channels. The clearance or relief notch 40 accommodates a cover mounting post, indicated at 82, which comprises a part of the elbow fitting 80 when the insert is fully assembled within the raceway section 10b.

In assembly lower edge portions of the insert, that is portions of the insert that have not been trimmed, engage the base walls 22, 22 to impart structural integrity to the insert. The seating tab 68, which aids in assembly, engages the base wall 22 of an associated raceway base channel 14 to provide further support for the insert within the raceway channel. The insert 60 is further secured in position within the raceway channel 20b by the raceway covers and the cover for the fitting 80 (not shown).

Figure 24:
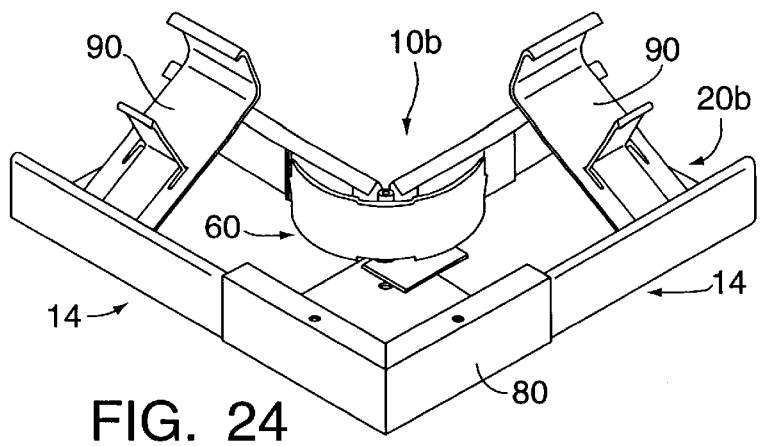
FIG. 24 is a perspective view showing a divided flat elbow raceway fitting in a partial state of assembly.
Figure 25:
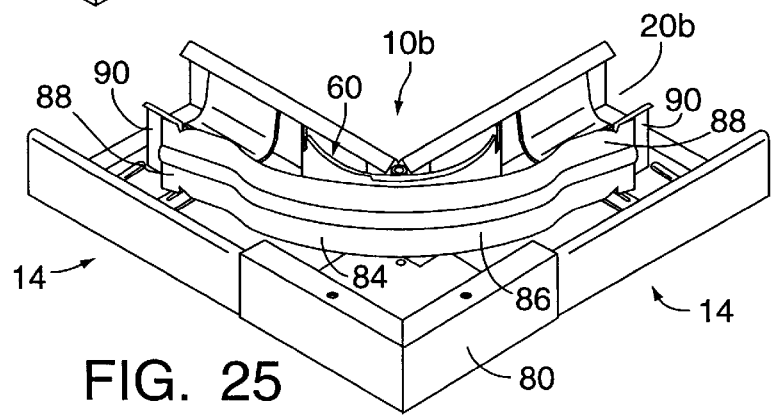
FIG. 25 is a perspective view showing the raceway fitting of FIG. 24 in a further state of assembly.
Figure 26:
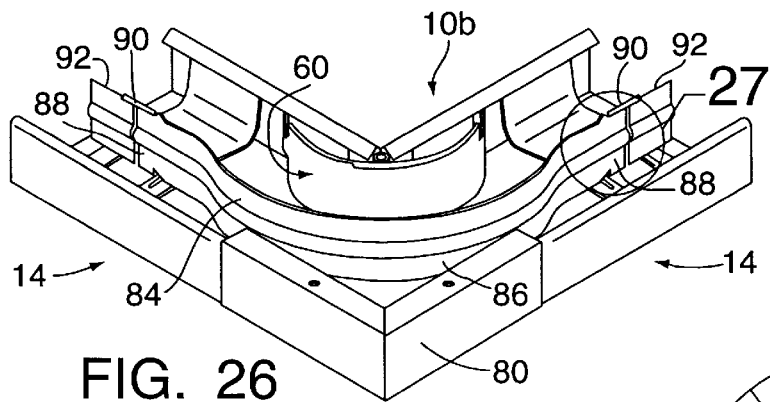
FIG. 26 is a perspective view showing the raceway fitting of FIG. 24 in a fully assembled condition.
Figure 27:
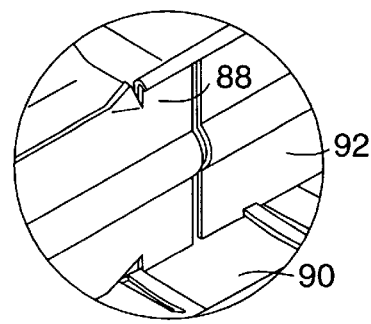
FIG. 27 is an enlarged fragmentary perspective view of the raceway fitting of FIG. 26 showing the divider coupling.

If the raceway section 10b, hereinbefore described, is to be employed as part of a divided raceway system, an arcuate dividing wall is positioned within the raceway channel substantially as shown in FIGS. 24 and 25. The illustrated divider, indicated at 84, includes an arcuate central portion 86 which has a center of curvature coincident with the center of curvature of the insert 60 when the two parts are assembled within the raceway section 10b. Rectilinear end portions of the divider, indicated at 88, 88, are integrally connected to the arcuate portion, 86 to facilitate retention of the divider 84 within the channel section 10b. The arcuate divider 84 is retained within the raceway channel 20b by retaining clips 90, 90 which engage the end portions of the divider to secure it in a manner well known in the raceway art. The divider end portions 88 are coupled by the clips 90, 90 to straight dividers 92, 92 which extend from straight raceway runs (not shown) and which comprise part of the raceway installation as shown in FIG. 27.

Figure 28:
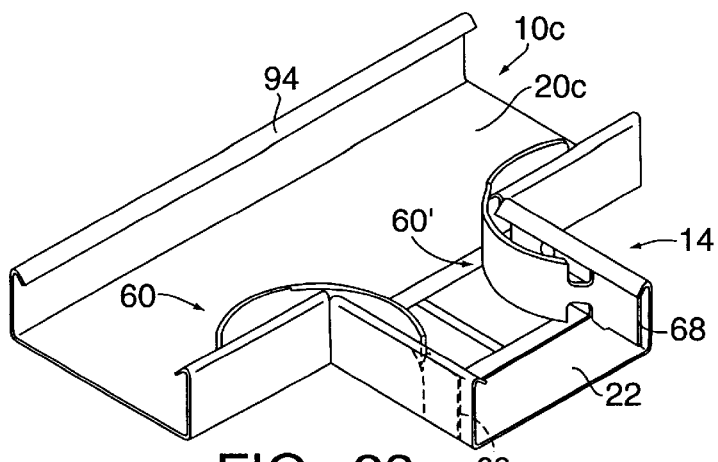
FIG. 28 is a perspective view of a flat raceway tee fitting shown with the cover removed.

In FIG. 28 there is shown an undivided flat tee section of a raceway, indicated generally by the reference numeral 10c. The non-linear raceway section or fitting base 10c is formed by a raceway run (Wiremold 4000 Two-Piece Surface Steel Raceway) joined in intersecting relation to a tee fitting 94 (Wiremold Tee 4105). The tee fitting 94 and the coupled raceway run intersect at right angles to form a raceway channel 20c having two angular corners therein formed by the intersection of a main portion of the channel and a branch portion, substantially as shown. The angular corners formed within the channel are shielded in a manner generally aforedescribed by two radiused inserts 60, 60'. The connecting portion of the tee fitting 94 extends for some distance into the raceway base channel 14 and is disposed slightly above the plane of the inner-surface of the base wall 22. Thus, and edge portion of the arcuate wall on each insert 60, 60' must be trimmed or cut away to provide clearance for the extending portion of the tee fitting 94.

Figure 29:
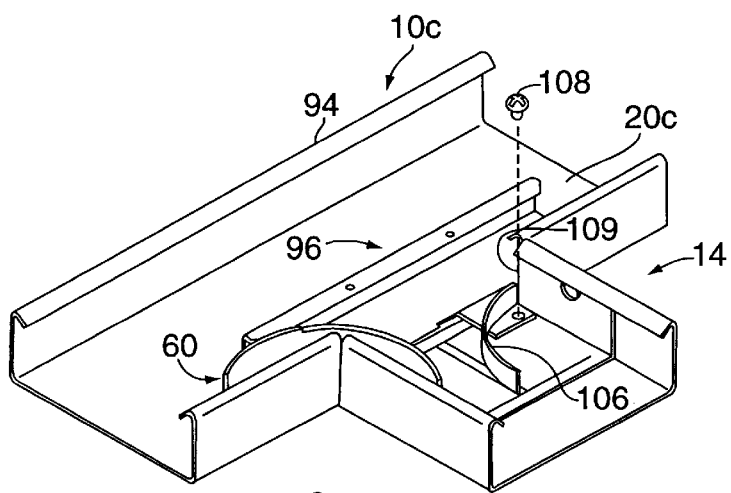
FIG. 29 is a perspective view showing a divided flat raceway tee fitting in a partial state of assembly.
Figure 30:
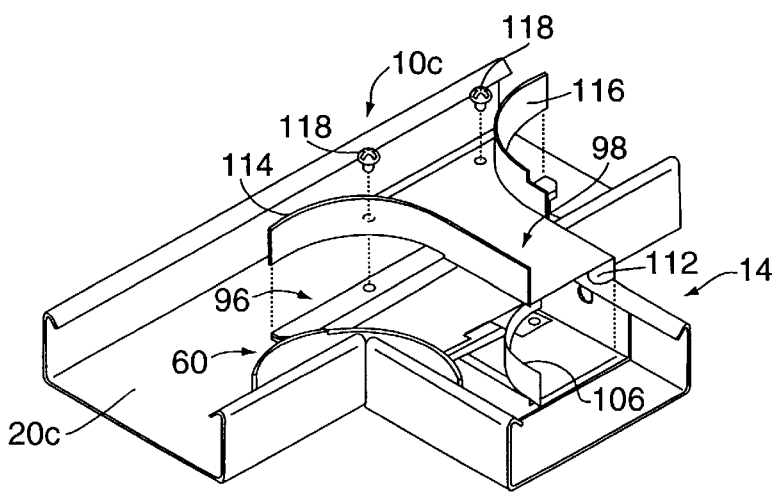
FIG. 30 is an exploded perspective view of the raceway fitting shown in FIG. 29.
Figure 31:
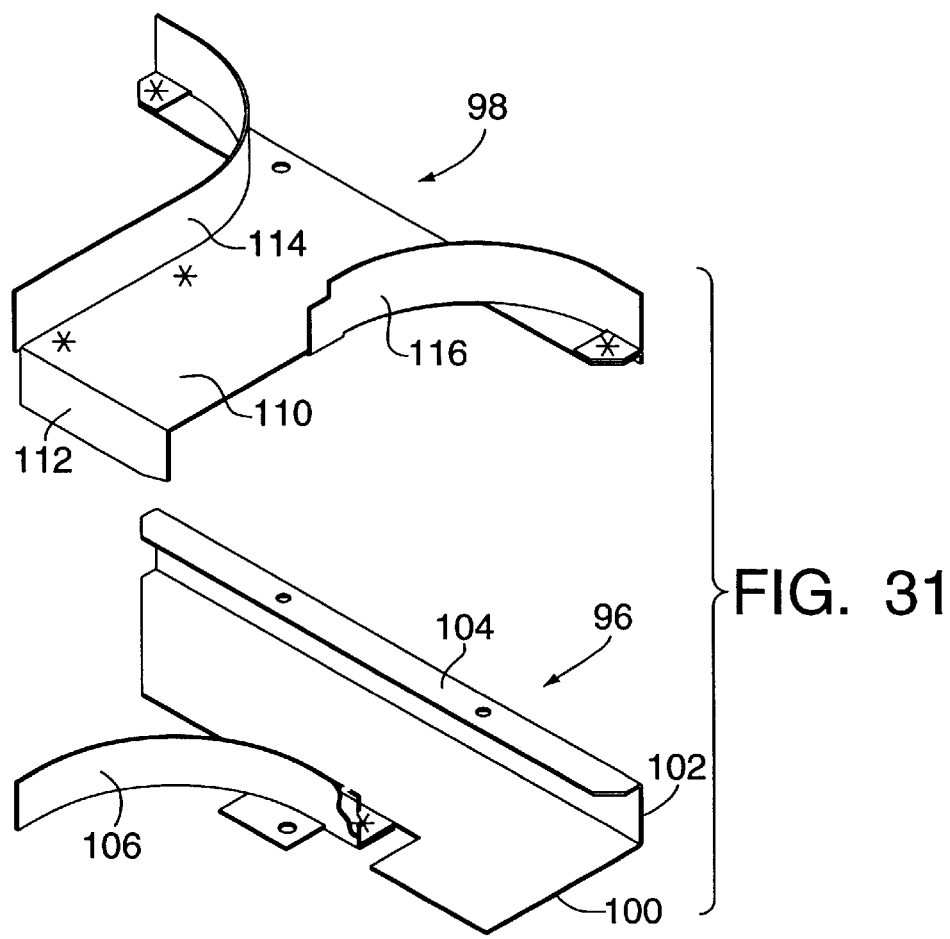
FIG. 31 is a somewhat enlarged exploded perspective view showing the divider assembly of the raceway fitting shown in FIGS. 29 and 30.
Figure 32:
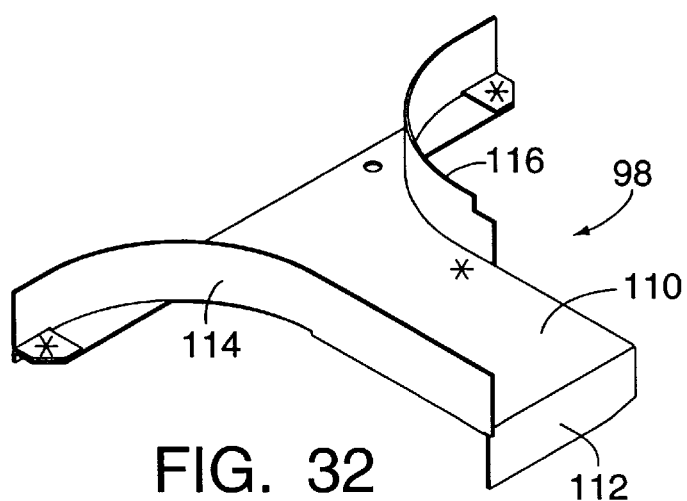
FIG. 32 is another perspective view of the top base assembly shown in FIG. 31.

It will be noted that the corners of the tee section 10c to be shielded are "handed", since the tee has both a right hand and a left hand corner. However, the inserts and 60–60' are also "handed" since both edges of the arcuate wall 62 provide provision for the removal of material to provide clearance. Thus, the one insert 60' may be trimmed, as necessary, for use with one corner. The second insert 60 may be inverted and trimmed along its other edge for positioning with respect to the other corner of the tee. This condition will be apparent from FIG. 28, since the tabs 68, 68 on the two inserts 60 and 60' extend in the same direction as shown in the drawing. In FIGS. 29 and 30 the raceway fitting 10c is shown arranged as a divided raceway fitting. A radiused insert 60, employed in the manner hereinbefore generally described provides shielding for the left hand corner of the tee fitting 10c, as it appears in the drawings. A divider, mounted within the raceway channel 20c is formed by a lower base assembly and an upper base assembly carried by the lower base assembly. Specifically, and referring further to FIGS. 31 and 32, the lower base assembly essentially comprises a formed metal lower base plate 100 having an upwardly extending portion 102 which carries a raised shelf 104. An arcuate transition wall 106 is spot welded to the base plate 100 in spaced relation to the shelf and has an upper edge disposed generally within the plane of the shelf. The lower base plate 100 is secured to the base wall of the raceway section by a single fastener 108 (FIG. 29). When the base assembly is mounted within the raceway channel 20c the transition wall curves arcuately outwardly and away from the lower portion right hand corner or second corner formed within the raceway channel 20c by intersection of the channel walls and indicated at 109, as shown in FIG. 29, and provides arcuate transition with a position of the second corner.

The upper base assembly 98 includes an upper base plate 110 having a depending wall 112. The upper base plate also carries a pair of arcuate walls which includes a third wall 114 and a second wall 116 which curve arcuately from the main channel to the branch channel, substantially as shown. The upper base assembly 98 rests upon the upper shelf 104 and the upper edge of the arcuate transition wall 106 and is secured to the shelf 104 by a pair of fasteners 118, 118. In assembly, the second arcuate wall at the right hand side of the upper base assembly provides arcuate transition with the upper portion of the second corner 109. The ends of the walls 114 and 116, which are located in the main portion of the channel are coupled to straight dividers (not shown) of associated straight raceway runs coupled to the tee.

We claim:

1. In a surface mountable electrical raceway fitting having a fitting base formed by intersecting channel sections, said channel sections having a plurality of walls, including an inner end wall defining an exterior mounting surface and spaced upper and lower walls projecting outwardly from said inner end wall, said walls defining at least one angular corner within said fitting base, the improvement comprising at least one arcuate insert disposed within said fitting base and forming an arcuate corner within said fitting base and between said at least one angular corner and the interior of said fitting base, and insert retaining means for releasably securing said at least one arcuate insert in assembly with said raceway fitting to isolate said at least one angular corner from said interior of said fitting base.

2. In a surface mountable electrical raceway fitting as set forth in claim 1, the further improvement wherein said at least one arcuate insert is formed from resilient dielectric material.

3. In a surface mountable electrical raceway fitting as set forth in claim 1, wherein said at least one arcuate insert has a substantially uniform thickness.

4. In a surface mountable electrical raceway fitting as set forth in claim 1, the further improvement wherein said insert retaining means is further defined as snap-in insert retaining means.

5. In a surface mountable electrical raceway fitting as set forth in claim 1, the further improvement wherein said insert retaining means comprises wall engaging means at opposite ends of said at least one arcuate insert for engaging associated portions of the upper, lower and inner end walls of said channel sections.

6. In a surface mountable electrical raceway fitting as set forth in claim 1, the further improvement wherein said fitting base comprises an internal elbow.

7. In a surface mountable electrical raceway fitting as set forth in claim 1 the further improvement wherein said fitting base comprises an external elbow.

8. In a surface mountable electrical raceway fitting as set forth in claim 1, the further improvement wherein said at least one arcuate insert is made from dielectric plastic material having a substantially uniform thickness and includes an arcuate wall having a convex surface and a concave surface and subtending an arc of approximately ninety degrees, said at least one arcuate insert having upper and lower edges and opposite end portions, said at least one arcuate insert having retaining panels integrally connected to said opposite portions and projecting radially outwardly therefrom.

9. In a surface mountable electrical raceway fitting as set forth in claim 8 the further improvement wherein said at least one arcuate insert includes radially disposed angular stiffening members projecting radially outwardly from the upper and lower edges of said at least one arcuate wall.

10. In a surface mountable electrical raceway fitting as set forth in claim 9 the further improvement wherein said stiffening members include intersecting first and second portions angularly disposed at approximately ninety degrees relative to each other.

11. In a surface mountable electrical raceway fitting as set forth in claim 10 the further improvement wherein said insert retaining means comprise free ends of said stiffening members.

12. In a surface mountable electrical raceway fitting as set forth in claim 11, the further improvement wherein said free end portions are resiliently biased into engagement with said upper and lower walls when said at least one arcuate insert is in assembly with said fitting base.

13. In a surface mountable electrical raceway fitting as set forth in claim 12 wherein said upper and lower walls have inwardly turned marginal edge portions cooperating with said upper and lower walls to define inwardly open recesses at the outer edges of said upper and lower walls and opening into the interior of said fitting base and said retaining means includes retaining tabs projecting radially outwardly from said stiffening members in spaced relation to said free end portions.

14. In a surface mountable electrical raceway fitting as set forth in claim 13 wherein said fitting base comprises an internal elbow the further improvement wherein said retaining tabs are disposed within said inwardly open recesses when said at least one insert is assembled with said internal elbow.

15. In a surface mountable electrical raceway fitting as set forth in claim 13 wherein said fitting base comprises an external elbow the further improvement wherein said retaining tabs engage the inner end walls of said intersecting channel sections and said opposite end portions engage the forward end portions of the upper and lower walls of said intersecting channel sections when said at least one arcuate insert is assembled with said external elbow.

16. In a surface mountable electrical raceway fitting as set forth in claim 8 the further improvement wherein said at least one arcuate insert has spaced apart generally secant shaped reinforcing ribs integrally connected to said concave surface and disposed in generally radial planes.

17. In a surface mountable electrical raceway fitting as set forth in claim 16 the further improvement wherein each of said secant shaped reinforcing ribs has an exposed rectilinear edge.

18. In a surface mountable electrical raceway as set forth in claim 8 wherein said channel sections include dividing walls disposed in parallel relation to the top and bottom walls and cooperating with the walls of said channel sections to define separated compartments within said fitting base, the further improvement comprising said at least one arcuate wall having a slot therethrough disposed in a radial plane and receiving and supporting portions of said dividing walls therein.

19. In a surface mountable electrical raceway fitting as set forth in claim 18 the further improvement wherein said slot extends between and terminates at said retaining panels at the opposite ends of said arcuate portion.

20. In a surface mountable electrical raceway fitting as set forth in claim 1 the further improvement wherein said fitting base comprises a flat elbow.

21. In a surface mountable electrical raceway fitting as set forth in claim 1 the further improvement wherein said fitting base comprises a tee fitting and said walls define a second angular corner within said fitting base.

22. In a surface mountable electrical raceway fitting as set forth in claim 21 the further improvement wherein said at least one arcuate insert isolates said at least one angular corner from the interior of said fitting base and said fitting base includes a second arcuate insert which isolates said second angular corner from the interior of said fitting base.

23. In a surface mountable electrical raceway fitting as set forth in claim 21 the further improvement wherein said at least one arcuate insert isolates said at least one angular corner from the interior of said fitting base and said fitting base includes a second arcuate insert forming an arcuate transition with a first portion of said second angular corner and extending in a first arcuate direction from said second angular corner and said fitting base includes a third arcuate insert forming an arcuate transition with a second portion of said second angular corner and extending in a second arcuate direction from said second angular corner.

* * * * *